United States Patent [19]

Purcocks

[11] Patent Number: 4,507,820
[45] Date of Patent: Apr. 2, 1985

[54] CONCEALABLE HANDLE WITH A SLIDABLE PIVOT

[76] Inventor: Dale M. Purcocks, 27 Beechwood Close, Boghall Rd. Bray, Wicklow, Ireland

[21] Appl. No.: 511,523

[22] Filed: Jul. 7, 1983

[51] Int. Cl.³ .................... B65D 25/32; E05D 11/08; E05D 13/08
[52] U.S. Cl. ........................ 16/125; 16/341; 16/342; 16/364; 16/DIG. 24; 403/113
[58] Field of Search ................ 16/110 R, 114 R, 123, 16/124, 125, 126, 127, 337, 341, 342, 359, 360, 361, 364, DIG. 15, DIG. 24, DIG. 28; 403/61, 113, 116, 348, 353

[56] References Cited

U.S. PATENT DOCUMENTS

| | | | |
|---|---|---|---|
| 283,785 | 8/1883 | Howard | 16/126 |
| 1,346,487 | 7/1920 | Doyle | 403/353 X |
| 2,136,141 | 11/1938 | Loftin et al. | 16/337 |
| 2,177,816 | 10/1939 | Wertman | 403/353 X |
| 2,697,244 | 12/1954 | Lincke | 16/126 X |
| 3,849,833 | 11/1974 | Watt, Jr. | 16/125 |
| 4,029,248 | 6/1977 | Lee | 16/114 R |
| 4,189,804 | 2/1980 | Flowerday | 16/126 |
| 4,453,850 | 6/1984 | Purcocks | 402/4 |

FOREIGN PATENT DOCUMENTS

| | | | |
|---|---|---|---|
| 1391147 | 4/1975 | United Kingdom | 16/126 |
| 61622 | 10/1982 | United Kingdom | 16/341 |

Primary Examiner—Fred A. Silverberg

[57] ABSTRACT

A concealable handle for carrying an article having one or two elonated channels with a U-shaped cross-section. The handle works in combination with the channels, the handle comprising two elongated straps proportioned to fit inside the channels, one inside each channel. Each strap has a pivot at one end and an attachment at the opposite end. The pivot is too wide to slide out of the channel and is proportioned with longitudinal dimension about equal to the distance between the bottom of the channel and the lips. The latitudinal dimension, perpendicular to the longitudinal dimension, is shorter than the longitudinal dimension and the intersection of the edges is rounded. The dimensions of the pivot allow sliding of the strap means along the length in the channel and free rotation of the strap out of the channel to the perpendicular position. At the perpendicular, the pivot is restricted from further rotational movement. Further, at this position, movement of the pivot along the channel is restricted. When one strap in each channel is used, the attachment means of the straps attach together to create a graspable handle.

4 Claims, 12 Drawing Figures

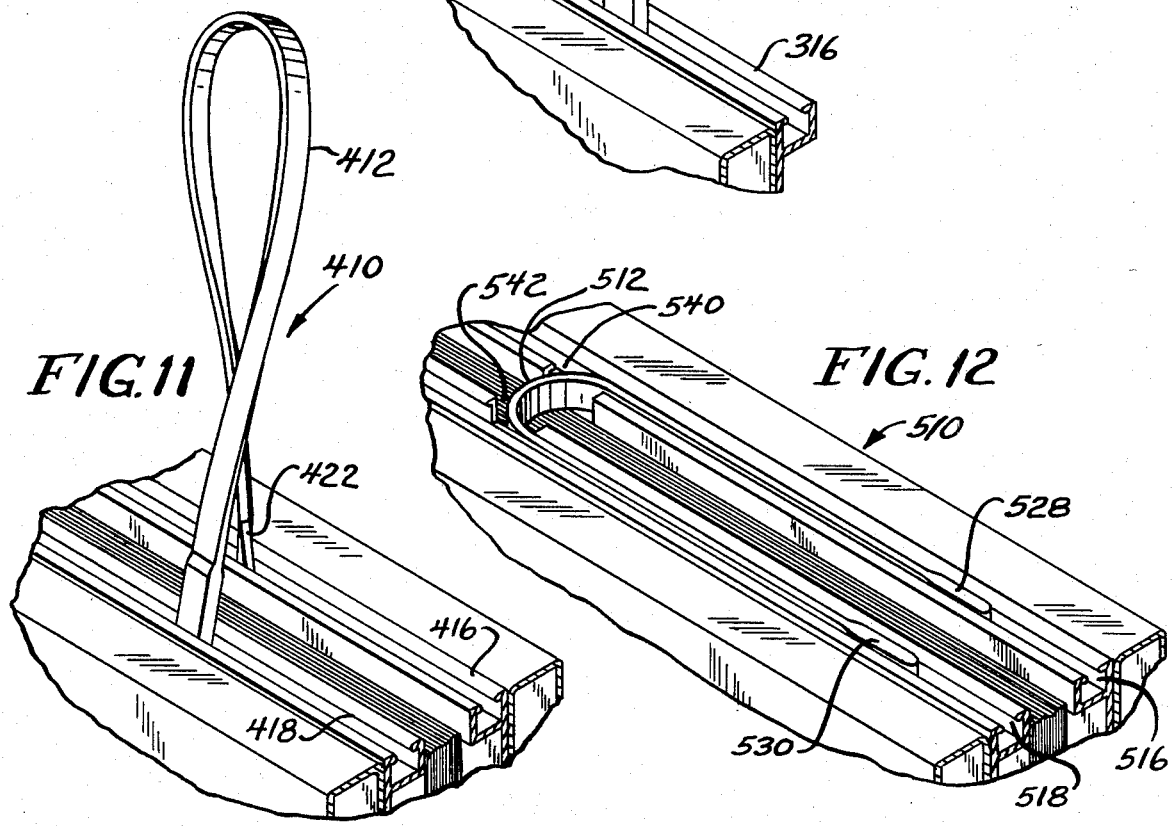

CONCEALABLE HANDLE WITH A SLIDABLE PIVOT

BACKGROUND OF THE INVENTION

The present invention relates to concealable handles for use in carrying articles. In particular, it relates to handles which can be concealed in an elongated channel of an article which can be used to carry the article.

Handles are frequently attached to an article to facilitate carrying it. Handles, while adding to the usefulness of the article and ease and convenience to the carrier, do not always contribute to the aesthetic value and may detract from the usefulness of the article when not in use. This is especially a problem for items such as large computer printout books, ledgers, office equipment, furniture or other items which are heavy or bulky and are more easily carried by a handle but which are not well suited for attachment of a handle either because of the particular use of the item or because the aesthetic value of the item would be reduced.

For example, large books of computer printout paper may weigh upwards of twenty-five pounds and are an awkward shape for carrying. Clearly, a handle on such a book would be very useful. However, traditional handles would interfere with operation of the book, either keeping it from lying flat if put on the covers, or obstructing opening of the book if put on the binding.

Pieces of furniture, a table for instance, can be large, heavy, awkward objects which are difficult to carry without a handle. However, having a handle on a table detracts significantly from the appearance of the item.

Other items have similar problems which would be solved by providing a concealable handle which is out of the way when the handle is not in use but which can be quickly and easily actuated for use as a handle when needed. The handle must be retractable after use, self-contained and reusable.

The objects of the invention are to solve the above-mentioned problems in a new and improved manner. Other and further objects are further apparent from the following description.

SUMMARY OF THE INVENTION

According to the invention, there is provided a handle for use in one or two U-shaped, elongated channels, each channel having two lips. The handle is a flexible strap having a pivot at one end and attachment means at the opposite end. The pivot is rectangularly shaped with a width having dimensions which keep it from escaping the channel past the lips. The length of the pivot is about equal to the internal height of the channel and the depth is less. These dimensions allow for movement of the pivot along the channel and for free rotation until the length of the pivot is oriented parallel to the internal height of the channel with the strap perpendicular to the channel, thereby blocking further rotation of the pivot and, accordingly, the strap. The strap is restricted or "locked" in this position because reverse rotation is restricted by the corner of the rectangular pivot hitting against the lip. Therefore, the strap tends to stay in a position perpendicular to the elongated channel. The attachment means may be used to attach the free end of the strap to the article, the same channel or a second parallel channel. Two straps may be provided, one in each channel, to be attached to each other via their respective means for attachment. One strap could also be used in one channel by having a loop-formable attachment means or by having a pivot in the channel at each end of the strap.

The strap also may have other features facilitating its use. For example, a fitted portion near the pivot would wedge between the lips to help hold the strap in rotated positions short of perpendicular to the channel. A tab near the attachment means end allows easy access to that end by insertion of a fingernail or other probe along the edge of the channel. The free, rotatable end of the strap is thereby easily and quickly removed from its concealed position and ready for use.

BRIEF DESCRIPTION OF THE DRAWING

The attached drawing figures illustrate the preferred embodiment and five further embodiments of the invention. In the drawing:

FIG. 8 is a perspective view of a first alternative embodiment shown with the handle positioned for carrying;

FIG. 9 is a perspective view of a second alternative embodiment, shown with the handle positioned for carrying;

FIG. 10 is a perspective view of a third alternative embodiment, shown with the handle positioned for carrying;

FIG. 11 is a perspective view of a fourth alternative embodiment, shown with the handle positioned for carrying; and FIG. 12 is a perspective view of a fifth alternative embodiment, shown in the concealed position.

DETAILED DESCRIPTION OF THE EMBODIMENTS

Figure 1:
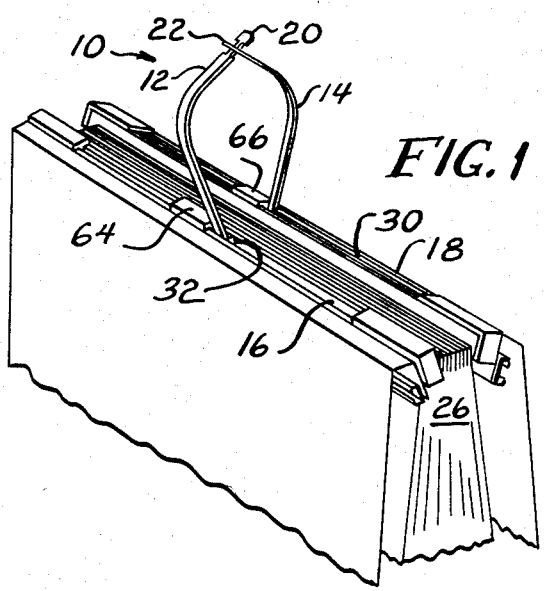
FIG. 1 is a perspective view of the preferred embodiment shown with the handle positioned for carrying.

Referring to FIGS. 1 through 7, the preferred embodiment is designated generally by the numeral 10. This preferred embodiment, as shown in FIG. 1, is used as a concealable handle for carrying a volume of computer printouts, bound by the type of device described in U.S. Pat. No. 4,453,850, entitled Support Device for A Binder System. However, the invention is in no way limited to this use. The preferred embodiment and various alternative embodiments also are contemplated as utilized with many other different kinds of objects, as previously discussed.

Figure 2:
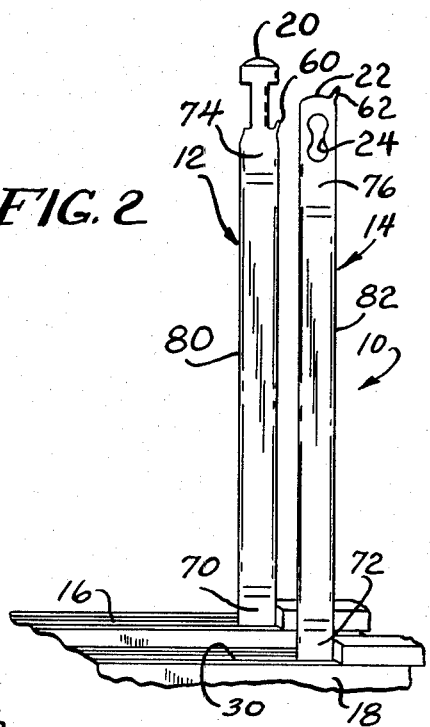
FIG. 2 is a perspective view of the preferred embodiment shown with the straps withdrawn from the channels, but not attached.

With respect to the preferred embodiment, FIG. 1 and FIG. 2 in particular, strap means 12 and 14 are situated in elongated channels 16 and 18, respectively.

Strap means 12 has T-shaped attachment means 20 for reversible attachment to the attachment means 22 of strap means 14. FIG. 2 shows the strap means 12 and 14 oriented perpendicular to channels 16 and 18 but with attachment means 20 to 22 not engaged. Said attachment means are engaged by twisting the T-shaped attachment means 20 to be oriented sideways to attachment means 22 and subsequently forcing the T-shaped attachment means 20 through oblong hole 24. Allowing the T-shaped attachment means to return to its natural orientation parallel to attachment means 22 causes the T-shape to become perpendicularly oriented to the length of the oblong hole 24 and, consequently, unable to disengage from the oblong hole 24. The oblong hole 24 is somewhat pinched, having an hourglass shape. This shape is desirable both to hold attachment means 20 in the upper part of the oblong hole 24 and to avoid escape of the T-shaped attachment means 20 from attachment means 22 resulting from widening of oblong hole 24. FIG. 1 shows the strap means 12 and 14 prepared for carrying the object 26, with attachment means 20 and 22 engaged to form a graspable handle. Of course, the invention is not limited to attachment means shown in the drawing, but contemplates use of snaps, velcro, hooks, or any other suitable means known in the art for attaching the ends of two elongated items.

Figure 7:
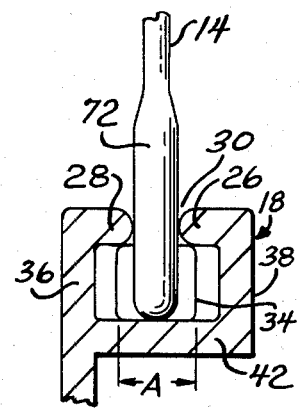
FIG. 7 is a side plan view perpendicular to the view of FIG. 6, with the strap in the same position, and with the channel cut away along the cross-section.

The strap means 20 and 22 are proportioned to fit sideways into elongated channels 16 and 18. The channels 16 and 18 have a rectangular cross-section, as illustrated in FIG. 7, with lips 26 and 28 projecting toward opposite sides of the channel 18. This channel may also have curved sides or a bottom or any other cross-sectional shape suitable for holding the strap and having an open side allowing for escape of the strap means 14. The various possible cross-sectional shapes will be described generally as a U-shaped cross-section. The lips 26 and 28 define an elongated exit 30 between them shown in FIG. 7 with strap 14 projecting therethrough.

The strap means 12 and 14 are pivotable into and out of channels 16 and 18 about pivots 32 and 34 respectively. The pivots (pivot 34 shown in detail in FIGS. 4 through 7 being representative also of pivot 32) have a three-dimensional rectangular shape. The pivots 32 and 34 have a width (shown as dimension A in FIGS. 4 and 7) at least as wide as the exit 30 so that the pivot 34 cannot escape channel 18 between lips 26 and 28. The pivot 34 may be as wide as the internal width of the channel between the walls 36 and 38 of channel 18.

Figure 5:
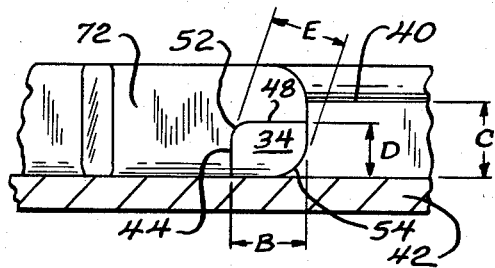
FIG. 5 is a detailed side plan view of the pivot portion of the strap of the preferred embodiment shown in the channel with the channel shown cutaway.

The pivot 34 has a longitudinal dimension, or length, shown in FIG. 5 as dimension B, which is approximately equal to the internal height C of the channel 18 as bounded by the lower edge 40 of the lips 26 and 28 and the bottom 42 of the channel. Therefore, when the pivot 34 is oriented with lengthwise dimension parallel to the internal height C of the channel 18, the pivot 34 fits snugly in the channel 18 and further forward rotation of the pivot 34 is obstructed by pressure of the top 44 of the pivot 34 against the lower edge 40 of lips 26 and 28 and concomitant pressure of the bottom 46 of the pivot 34 against the bottom 42 of the channel.

The third dimension of the pivot, the depth D, is less than the length B. It should be short enough so that diagonal dimension E is approximately equal to the internal height of the channel C or, alternatively, slightly longer. This is preferably accomplished by rounding the corners 52 and 54 where the longitudinal edge 48 of the pivot meets the top 44 in order to reduce dimension E. The invention contemplates other combinations of lengths and configurations to accomplish the result that dimension E is approximately equal to or slightly greater than dimension C.

Figure 3:
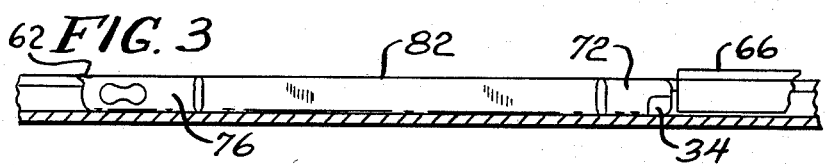
FIG. 3 is a side plan view of a single strap of the preferred embodiment situated in the channel, the channel shown cutaway.
Figure 4:
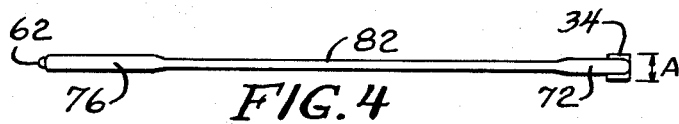
FIG. 4 is a top plan view of a strap of the preferred embodiment.
Figure 6:
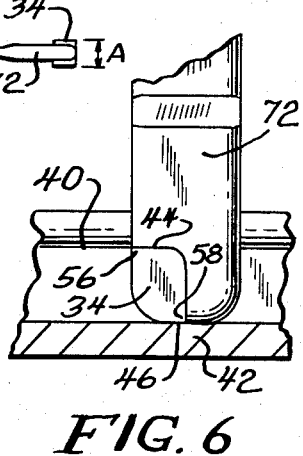
FIG. 6 is a detailed, side plan view of the pivot portion of the strap shown in the channel with the strap oriented perpendicular to the channel and with the channel shown cut away.

The dimensions of the pivot 34 are important to rotation of the strap means 14 from the concealed position inside channel 18, shown in FIGS. 3 and 5, to the upright position perpendicular to the channel 18, as shown in FIGS. 2, 6 and 7. When the handle is not in use, the strap means 12 and 14 are positioned lying flat in their respective channels 16 and 18. However, when use of the handle is desired, the attachment means 20 and 22 end of the strap means 12 and 14 are pivoted upward out of the channels 16 and 18 about pivots 32 and 34. Rounded corner 54 facilitates smooth rotation of strap means 14 to the position perpendicular to channel 18. As the strap means 14 is rotated upward, the pivot rotates freely until dimension E is about parallel to dimension C, the internal height of channel 18. At that point a slight resistance against rotation is met corresponding to the pressure of corner 52 against edge 40 and corner 54 against channel bottom 42. As the strap means 14 passes this position the resistance is constant or may decrease slightly until the dimension B of the pivot 34 is parallel to dimension C and the pivot fits snugly in the channel 18 with top 44 against edge 40 and pivot bottom 46 against channel bottom 42. At this point, further rotation is blocked because of the pivot corners 56 and 58 are not rounded and, consequently, the length of the pivot between these corners is significantly greater than dimension C and cannot rotate past the perpendicular position.

Orientation of the strap means 14 perpendicular to the channel 18 is maintained by the pivot 34 fitting snugly in channel 18 prohibiting further forward rotation past the perpendicular. Rotation backwards toward the channel is slightly restricted by the necessity of dimension E sliding through the position parallel with dimension C. The result of the complete forward motion is either a snug fit into the perpendicular orientation (if E is about equal to C) or a slightly snapping into place (if E is slightly longer than C). Of course, as mentioned above, the invention is not limited to the proportions shown in the Figures but contemplates that other pivot dimensions and proportions can be used to accomplish the results described.

The strap means 12 and 14, including pivot, are proportioned to be slid into the channels 16 and 18 from the open end of the channels. The strap means is slid in with dimension D of the pivot (the depth) substantially parallel to dimension C, thereby allowing the pivot to move transversely in the channel to the desired position. This is an advantage of the handle because the position of the handle can be adjusted along the channels 16 and 18. However, due to the dimensions of the pivots 32 and 34, the handles will "lock" into place after being oriented perpendicular to the channels and will not slide transversely. In this manner, the handle is not only versatile as positionable at an infinite number of positions along the channels, but also is a stable handle which, when being used, does not slide in the channels.

The strap means 12 and 14 include tabs 60 and 62 projecting angularly upward on the exit 30 side of the strap means 12 and 14, preferably near attachment means 20 and 22. These tabs 60 and 62 facilitate removal of the attachment means 20 and 22 ends of the strap means 12 and 14 from the channels. A probe, such as a fingernail, run along the exit 30 of channel 18 (similarly for the other channel 16 not shown) would catch on the tab 62. The attachment means 20 and 22 ends can then be lifted out of the channels 16 and 18. Blockages 64 and 66 in the channels 16 and 18 keep the strap means 12 and 14 from sliding away while tabs 60 and 62 are lifted from the channels. Of course, the invention contemplates use of indentations in the channel in place of shown blockages 64 and 66, and any other suitable means known in the art could be used. Operation of the tabs 60 and 62 is not in any manner limited to use with the blockages 64 and 66 and can be used to lift the attachment means ends out of the channels without said blockages.

The strap means 12 and 14 also include fitted portions 70, 72, near pivot ends and fitted portions 74 and 76 near the attachment means ends. These fitted portions are widened sections along the strap means having a width about equal to the exit 30 so that the fitted portion 72 (and similarly for fitted portion 70) is held between lips 26 and 28 when the strap means 14 is oriented out of the channel. Consequently, the strap means will stay oriented in rotated positions less than perpendicular to the channel 18. The fitted portions 70 and 72 are stiffer than the rest of the strap means because they are wider. This results in increased ability of the strap means 12 and 14 to stand upright in the channels 16 and 18.

Fitted portions 74 and 76 are widened sections similar to fitted portions 70 and 72. They act to increase stability and strength of the attachment means 20 and 22 and also act to keep the attachment means ends in the channel because of the frictional forces of the lips 26 and 28 upon the sides of the fitted portions. Consequently, inadvertent rotation of strap means 12 and 14 out of the channels 16 and 18 is avoided, even when the printout book 26 is oriented with binder downward.

Intermediate portions 80 and 82 on strap means 12 and 14 are preferably narrower than fitted portions 70, 72, 74 and 76 to increase flexibility of the strap means and to increase accessibility of the strap means 12 and 14 in the channels 16 and 18. However, the invention contemplates that significant variations can be made to the relative proportions of the strap means 12 and 14 without departing from the essential functioning elements of the handle.

Referring now to FIGS. 8 through 12, various alternative embodiments of the present invention are disclosed. This presentation of alternative embodiments should in no way be construed as a limitation of the possible embodiments contemplated by the invention. On the contrary, these variations are merely a sampling of the almost unlimited number of possible variations which can be employed without departing from the realm of the present invention.

Referring now to FIG. 8, the first alternative embodiment is marked generally by the numeral 110. The strap means 112 is essentially identical to strap means 12 disclosed above, except, preferably, being longer. Channel 116 is similar to channel 16 disclosed above. When not in use, strap means 112 lies in channel 116. However, when a handle is desired, the strap means 112 is rotated out of channel 116 and T-shaped attachment means 122 are twisted and slid into channel 116 through exit 130 (see 30 described above). Release of the attachment means 122 causes the T-shape to twist back against the walls of channel 116. The T-shaped cannot be pulled from the channel 116 due to the T-shape being obstructed by the lips 126 and 128. The attachment means 122 is removed by re-twisting the attachment means 122 while simultaneously withdrawing the attachment means 122 from channel 116.

When the attachment means 122 is engaged in channel 116 a graspable loop is formed by strap means 112. Of course, the attachment means 122 may be accomplished by snap, buckle, or any other suitable method known in the art. Further, the attachment means could be attached to the article instead of the channel. This also can be accomplished by any suitable connecting method known in the art.

Referring now to FIG. 9, the second alternative embodiment is marked generally by numeral 210. Strap means 212 has two pivot ends 228 and 230, each with a pivot in channel 216. When not in use, the pivot ends 228 and 230 are separated and the strap slides into channel 216. To use the handle, the strap means 212 is plucked from channel 216 by its intermediate portion 280 and pulled away from the channel 216. This causes pivot ends 228 and 230 to move together until each side of the strap means 212 is oriented perpendicular to channel 216 and, consequently, "locked" into place by action of the pivots.

Referring now to FIG. 10, the third alternative embodiment is designated generally by numeral 310. Strap means 312 is substantially similar to strap means 12 described above. Strap means 312 is preferably longer than strap means 12 and also has an oblong hole 324 similar to the oblong hole 24 in the attachment means 22 previously described. The handle is formed when strap means 312 is rotated out of channel 316 to a position perpendicular to the channel. The pivot "locks" the strap in this position. The T-shaped attachment means 322 is then twisted and inserted through oblong hole 324. Release of the attachment means 322 causes the T-shape to orient perpendicular to the oblong hole 324 and not be able to escape. A graspable handle is thusly formed.

Referring now to FIG. 11, the fourth alternative embodiment is generally designated by numeral 410. Strap means 412 also is similar to strap means 12, except strap means 412 will, in most cases, need to be longer because it is a single strap means attached between the channels 416 and 418. The fourth alternative embodiment is very similar to the first alternative embodiment shown in FIG. 8. It works essentially the same way with T-shaped attachment means 422 reversibly attachable to the other channel 416. Other suitable attachment means also are contemplated here.

Referring now to FIG. 12, the fifth alternative embodiment is generally designated by numeral 510. Strap means 512 has a pivot end 528 situated in channel 516 and pivot end 530 in the other channel 518. The strap means 512, when in the concealed position, lies partially in one channel 516 and partially in the other channel 518. Gaps 540 and 542 in the channels 516 and 518 allow the strap means 512 to exit one channel and enter the other parallel channel. The handle is lifted to the perpendicular position and "locked" into position by the action of the pivots to form a graspable loop for use as a handle. The strap means 512 can accommodate varying widths between the channels 516 and 518 by movement of the pivot ends 528 and 530 toward gaps 540 and 542 thereby providing an increased length of the strap means 512 between gap 540 of channel 516 and gap 542 of channel 518, to travel between the channels. A decrease in width in the distance between the channels is accomplished by the same procedure in the reverse direction.

The invention contemplates that preferably the strap means 12, 14, 112, 212, 312, 412 and 512 are made of a resilient flexible material such as a rubber or plastic. The strap means are preferably made out of an integrally molded resilient plastic (such as PVC). Alternatively, the strap means can be made of any suitable flexible materials or groups of materials known in the art to have the characteristics necessary to accomplish the specifications described above.

The channel has been thoroughly described in the Ser. No. 367,703 patent application, now U.S. Pat. No. 4,453,850, discussed above and incorporated by reference herein. It is normally constructed of a metal, such as aluminum, but is not limited to construction from a metal.

It is clearly seen that the present invention provides a significant improvement in concealable handles. A device is provided having advantages previously described as desirable, but the device is susceptible to modification in its form, operation, detailed construction and arrangement without departing from the principles involved or sacrificing any of its advantages. It is accordingly understood that the invention is not limited to the specific features shown, but that the means, method and construction herein disclosed comprise only the preferred and five alternative forms of many modes of putting the invention into effect. The invention is, therefore, claimed in any of its forms, or modifications, within the legitimate and valid scope of the appended claims.

What is claimed is:

1. A concealable handle for carrying an article having parallel first and second elongated channels with a U-shaped cross-section, each channel having two elongated lips, one projecting from each side of the U-shaped cross-section toward the opposite side, the handle comprising:

a first strap means having a first end, a second end, a pivot near the first end, a fitted portion near the pivot, and an attachment means near the second end, the first strap means proportioned to fit in the first channel and being slidable in said first channel when the first strap means lies parallel to said first channel;

a second strap means having a first end, a second end, a pivot near the first end, a fitted portion near the pivot and an attachment means near the second end, the second strap means proportioned to fit in the second channel and being slidable in said second channel when the second strap means lies parallel to said second channel;

wherein the pivots are substantially rectangular with longitudinal dimensions approximately equal to the inner dimension of the channel from the bottom of the channel to the inside edge of the lip whereby movement of the strap means past the position at which the pivot is wedged between said bottom and said lip is restricted; and wherein the pivots have widened sections proportioned to fit in the channels such that the pivots are restricted from escaping past the channel lips;

wherein the fitted portions have a width approximately equal to the distances between the lips of each channel.

2. The handle of claim 1 wherein the first and second strap means is made of a resilient material.

3. The handle of claim 1 wherein the attachment means of the first strap means is T-shaped and the attachment means of the second strap means contains an oblong hole, the respective attachment means being proportioned such that the T-shaped first attachment means can slide sideways through the oblong hole of the second attachment means but cannot slip back through the oblong hole when not oriented sideways.

4. The handle of claim 1 wherein the handle further comprises a tab attached to each of the strap means near the second end of the strap means, the tab projecting from the strap means to facilitate removal of the second end from the channel.

* * * * *